US006935037B1

(12) United States Patent
Garcia

(10) Patent No.: US 6,935,037 B1
(45) Date of Patent: Aug. 30, 2005

(54) TILE CONTOUR TOOL

(76) Inventor: Arthur Garcia, P.O. Box 587, Woodacre, CA (US) 94973

(*) Notice: Subject to any disclaimer, the term of this patent is extended or adjusted under 35 U.S.C. 154(b) by 0 days.

(21) Appl. No.: 10/404,412

(22) Filed: Mar. 31, 2003

(51) Int. Cl.[7] .............................. G01B 5/24; B43L 7/10

(52) U.S. Cl. .............................. 33/526; 33/452; 33/527; 33/DIG. 20

(58) Field of Search .......................... 33/415, 418, 419, 33/422, 430, 436, 452, 456, 458, 464, 469, 33/484, 485, 526, 527, DIG. 20, 465

(56) References Cited

U.S. PATENT DOCUMENTS

| | | | | |
|---|---|---|---|---|
| 1,015,773 A | * | 1/1912 | Auger | 33/456 |
| 1,157,587 A | * | 10/1915 | Rowland | 33/458 |
| 1,208,662 A | * | 12/1916 | Roth | 33/419 |
| D136,978 S | * | 1/1944 | Tomasini | 33/561.1 |
| 2,770,043 A | * | 11/1956 | Kwiecinski | 33/452 |
| 4,503,615 A | * | 3/1985 | Schreiber | 33/430 |
| 4,827,625 A | * | 5/1989 | Le Moal | 33/527 |
| 5,205,045 A | * | 4/1993 | Liu | 33/DIG. 20 |
| 5,461,794 A | * | 10/1995 | Huang | 33/418 |
| 5,617,642 A | * | 4/1997 | Marios | 33/526 |
| 5,701,680 A | * | 12/1997 | Garcia et al. | 33/526 |
| 6,260,283 B1 | * | 7/2001 | Abernathy et al. | 33/419 |
| 2003/0033724 A1 | * | 2/2003 | Barbosa | 33/526 |

* cited by examiner

*Primary Examiner*—Christopher W. Fulton
*Assistant Examiner*—Madeline Gonzalez
(74) *Attorney, Agent, or Firm*—Risto A. Rinne, Jr.

(57) ABSTRACT

An apparatus for tracing a contour onto a tile prior to cutting the tile includes a base member having a first longitudinal slot and a retaining lip disposed at one end thereof. A first extension member includes a second longitudinal slot and is pivotally attached to the base member by a fastener assembly that passes through the first and second longitudinal slots. A second extension member includes a third longitudinal slot and is pivotally attached to the first extension member by a second fastener assembly that passes through the second and third longitudinal slots. The second extension member includes a 45 degree angled end that terminates in a point, the point being useful for locating a point on an obstruction. The 45 degree end is used to orient the first and second extension members at a 45 degree angle with respect to a raised edge of the base member. An opposite square end of the second extension member is useful to align the first and second extension members at a ninety degree angle with respect to the base member.

15 Claims, 3 Drawing Sheets

TILE CONTOUR TOOL

BACKGROUND OF THE INVENTION

1. Field of the Invention

The present invention, in general relates to tools and, more particularly, to devices that are used to transfer (i.e., trace) a contour to a tile for cutting.

Tile layers (or setters) must cut tiles to match the contour of objects. For example, tiles may contact an angled wall, an uneven surface such as stone, or fit around common obstructions, such as an electrical outlet or a toilet base on a floor. Electrical outlets and certain other obstructions may be typically rectangular in shape, although hexagonal shaped electrical boxes are also sometimes used, for example in ceilings. Many of the more common obstructions are circular in shape, although complex shapes are sometimes also encountered as well.

It is desirable to be able to transfer as accurately as possible whatever contour that the tile must match (i.e., correspond with) so that the fit looks as exact and as professional as possible.

At present, the only tools available include a square or ruler which do not promote accuracy, especially at great distance. Also, these tools do not allow measuring around an object.

Furthermore, if a tile is improperly cut, that produces waste and all waste either increases cost or decreases profit.

There are many times when a tile must be cut at 90 degrees or, less often, at 45 degrees, and to have this capacity is also desired.

Another problem is that access to certain areas is limited. It is not possible to use bulky tools to measure the shape in tight quarters.

Accordingly, there exists today a need for a tile contour tool that is useful in accurately transferring a shape to a tile for cutting.

Clearly, such an apparatus would be a useful and desirable device.

2. Description of Prior Art

Rulers and squares are, in general, known. While the structural arrangements of the above described types of devices, may at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a tile contour tool that is useful in transferring a shape to a tile prior to cutting the tile to match the shape.

It is also an important object of the invention to provide a tile contour tool that is easy to use.

Another object of the invention is to provide a tile contour tool that provides an accurate reference point from which to measure a remote object.

Still another object of the invention is to provide a tile contour tool that can reach into a tight area.

Still yet another object of the invention is to provide a tile contour tool that can be used to trace any contour as accurately as is desired, even an especially irregular and complex shape.

Yet another important object of the invention is to provide a tile contour tool that is adapted for use with various attachments that can be used to proximate a shape of a distal object.

Still yet another important object of the invention is to provide a tile contour tool that is adapted for use as a square or to accommodate various angles.

Still yet a first further important object of the invention is to provide a tile contour tool that is adapted compensate for the joint thickness.

Still yet a second further important object of the invention is to provide a tile contour tool that tile layers or tile setters can use to trace a contour for cutting a tile.

Still yet a third further important object of the invention is to provide a tile contour tool that tile layers or tile setters can use to trace an angle for cutting a tile.

Still yet a fourth further important object of the invention is to provide a tile contour tool that tile layers or tile setters can use to trace a distance for cutting a tile.

Still yet a fifth further important object of the invention is to provide a tile contour tool that tile layers or tile setters can use to trace a contour for cutting a tile that automatically compensates for the thickness of the joint.

Briefly, a tile contour tool that is constructed in accordance with the principles of the present invention has a base member with a first longitudinal slot across a portion thereof and a retaining lip disposed at one end. A first extension member includes a second longitudinal slot and is pivotally attached to the base member by a fastener assembly that passes through the first and second longitudinal slots. A second extension member includes a third longitudinal slot and is pivotally attached to the first extension member by a second fastener assembly that passes through the second and third longitudinal slots. The second extension member includes a tapered end that includes a 45 degree angle that terminates in a point, the point being useful for locating a contour point. The 45 degree angle is used to rapidly dispose the first and second extension members at a 45 degree angle with respect to the base member. An accessory attachment member is useful to attach rings and malleable members to the tool to match the contour of various obstructions.

DETAILED DESCRIPTION OF THE INVENTION

Figure 1:
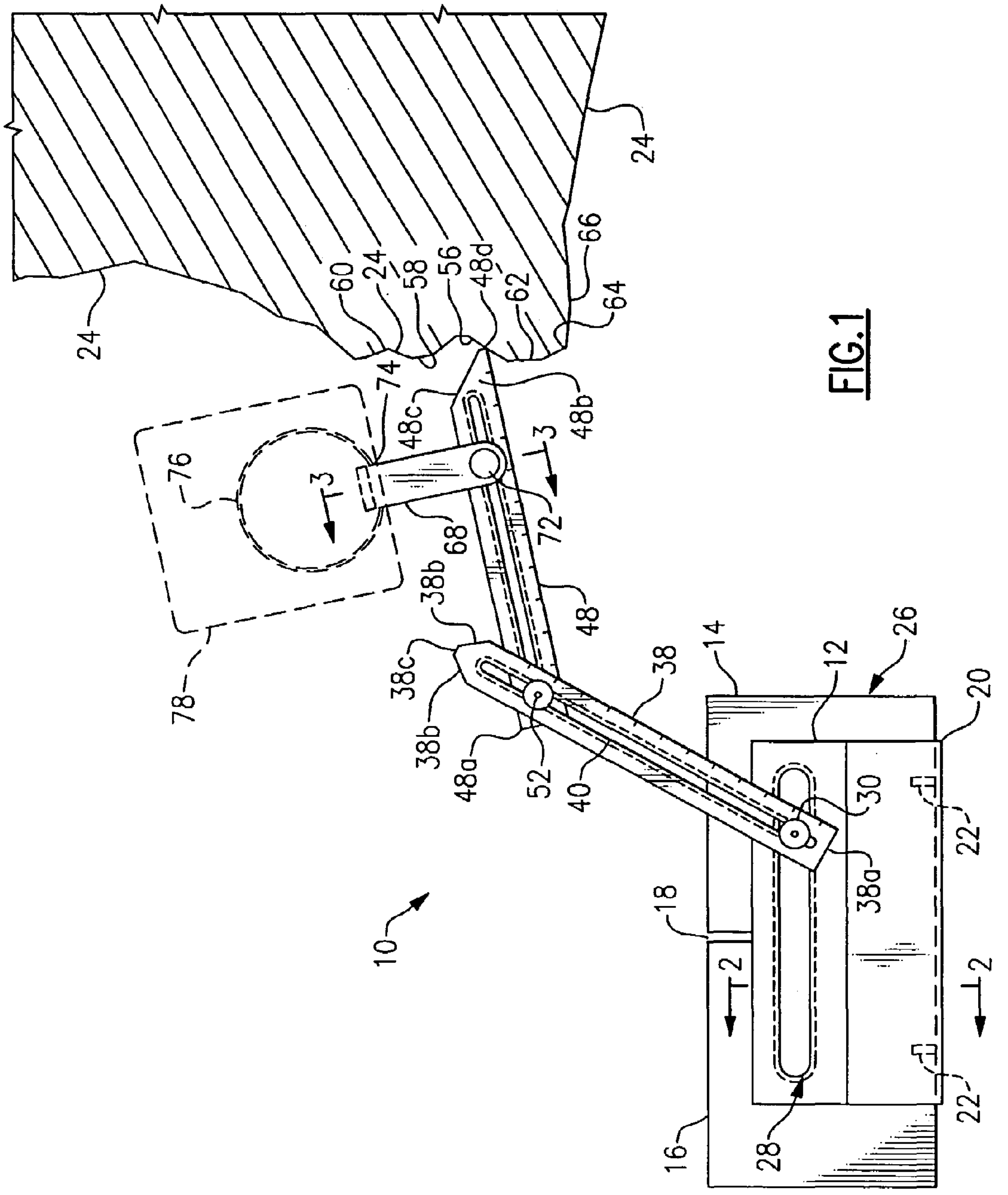
FIG. 1 is a plan view of a tile contour tool.

Referring to all of the drawings and in particular to FIG. 1 is shown, a tile contour tool, identified in general by the reference numeral 10.

A base member 12 is shown disposed over two tiles 14, 16. Intermediate the two tiles 14, 16 is a gap 18. The gap 18 is the distance between the two tiles 14, 16 and is sometimes referred to as the joint set or joint thickness.

Depending upon the type of tile 14, 16 being installed, the gap 18 may vary.

The base member 12 includes a retaining lip 20 that extends below a bottom plane of the base member 12. As shown in FIG. 1, the retaining lip is brought to bear against the two tiles 14, 16 which for the purpose of example are the last two to have been installed.

The retaining lip 20 is selected so as to have a thickness that approximates that of the gap 18. If a new smaller or larger gap (not shown) is used, a pair of screws 22 are removed and the retaining lip 20 is removed from the base member 12. A replacement retaining lip (not shown) having either a smaller or larger thickness (i.e., to match the new gap size) is attached to the base member 12.

Accordingly, when the tile contour tool 10 is used to locate remote points, as is described in greater detail hereinafter, the thickness of the joint set is automatically compensated for by the thickness of the retaining lip 20.

Also, the retaining lip 20 provides a secure and stable reference point, the edge of the two tiles 14, 16 that have already been installed, from which to measure the location of an obstruction 24. This makes location of the obstruction 24 absolute from the location of the two tiles 14, 16. As an additional tile or tiles (not shown) to be installed next must abut the two tiles 14, 16, the installed tiles 14, 16 become the only meaningful reference point.

For the purpose of improved clarity, the additional tiles intermediate the tiles 14, 16 and the obstruction 24 would likely be installed so as to abut a right hand edge 26 of one of the tiles 14. While the tile contour tool 10 can be used as shown, it is preferable to rotate the tile contour tool 10 ninety degrees so that the retaining lip 20 abuts the right hand edge 26 (not shown). This then, would locate the obstruction 24 relative to the right hand edge 26 while compensating also for the thickness of the gap 18. Other adjustments to the tile contour tool 10 are required if it is rotated, as are described in greater detail hereinafter. It is shown in its present orientation to provide a plan view that optimally shows all of its component parts and that after having had benefit of this disclosure, many changes in the orientation and use of the tile contour tool 10 are anticipated.

A first longitudinal slot, identified in general by the reference numeral 28, provides an opening from top to bottom that is included in the base member 12. The first longitudinal slot 28 is in parallel orientation with respect to the retaining lip 20, disposed a predetermined distance therefrom.

Figure 2:
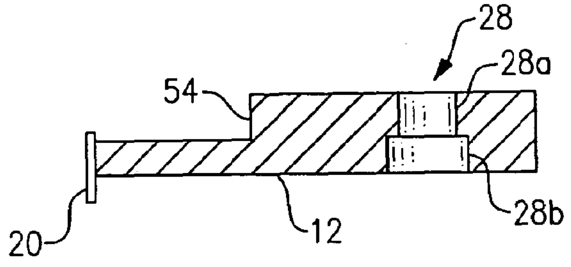
FIG. 2 is a cross sectional view of a base member taken on the line 2—2 in FIG. 1.

The first longitudinal slot 28 includes a narrower upper slot 28*a* (FIG. 2) and a wider bottom slot 28*b*.

Figure 4:
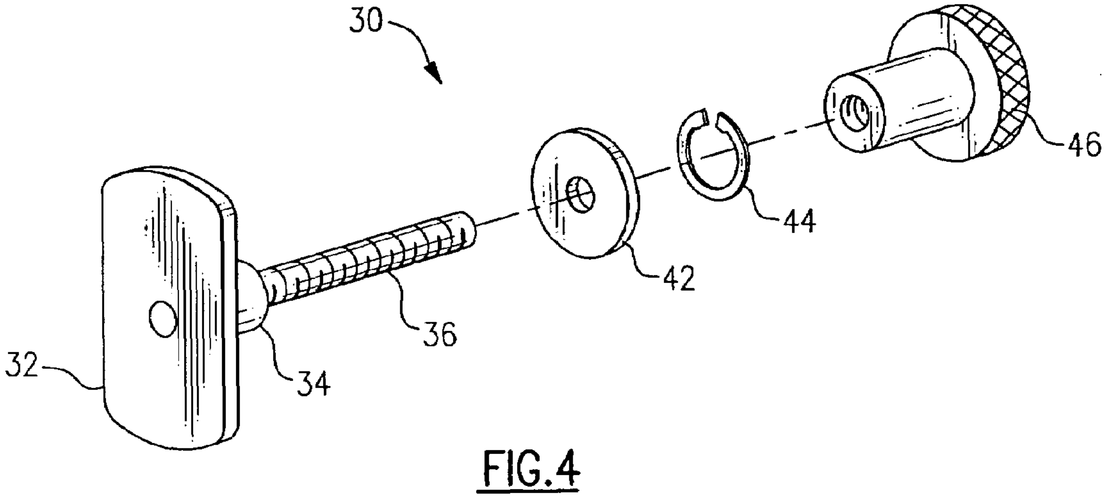
FIG. 4 is an exploded view of a fastener assembly.

The first longitudinal slot 28 is adapted to cooperate with a first fastener assembly, identified in general by the reference numeral 30 (FIG. 4).

The first fastener assembly 30 includes a base retainer 32 that includes a narrow side and a long side. The narrow side is adapted to fit into the wider bottom slot 28*b* so that it can slide along the longitudinal length thereof. The long slide prevents the base retainer 32 from rotating when it is disposed in the bottom slot 28*b*.

A threaded protrusion 34 is attached to the base retainer 32 and is adapted to fit into the upper slot 28*a*. A threaded rod 36 is threaded into the threaded protrusion 34 and extends therefrom out from the upper slot 28*a*.

A first extension member 38 includes a second longitudinal slot 40 and is pivotally attached to the base member 12 by the first fastener assembly 30. The second longitudinal slot 40 traverses a substantial portion of the longitudinal length of the first extension member 38 and is similar in cross section as to the first longitudinal slot 28. However the width of the second longitudinal slot 40 is slightly less than that of the first longitudinal slot 28.

The threaded rod 36 extends out of the first longitudinal slot 28 and passes through the second longitudinal slot 40.

A flat washer 42 and a lock washer 44 are placed over the threaded rod 36 on top of the first extension member 38. A threaded nut 46 having a knurled circumference is threaded over an exposed end of the threaded rod 36 and is tightened.

When the threaded nut 46 is loosened, the first extension member 38 can be displaced anywhere along the second longitudinal slot 40 with respect to the first fastener assembly 30. Similarly, the first fastener assembly 30 can be displaced anywhere along the first longitudinal slot 28. Once the desired position for the first extension member 38 is achieved, the threaded nut 46 is tightened. Because the base retainer 32 cannot rotate, merely tightening or loosening the threaded nut 46 a turn or two is sufficient to secure or loosen the first extension member 38 sufficient to position it where desired.

The first extension member 38 includes a square first end 38*a* and a tapered second end 38*b* that includes a flat nose portion 38*c*. The second end 38*b* is useful in positioning a second extension member 48 relative to the first extension member 38 so as better clear any structure (not shown) that might pose a further hindrance to using the tile contour tool 10.

This is accomplished by positioning the second extension member 48 closer to the second end 38*b* than shown if the second end 38*b* is in contact with the hindrance. Then the first fastener assembly 30 is loosened and the first extension member 38 is moved slightly down or closer to the base member 12, as desired.

The second extension member 48 includes a third longitudinal slot 50, that is similar in construction to the first longitudinal slot 28 and which has a similar width as that of the first longitudinal slot 28.

The second extension member 48 is disposed under the first extension member 38.

A second fastener assembly 52 is similar to the first fastener assembly 30. The second fastener assembly 52 passes through the second and third longitudinal slots 40, 50 and similarly secures the second extension member 48 at any angle and in a parallel planar attitude with respect to the first extension member 38 and the base member 12.

The second extension member 48 includes a square first end 48*a* and a second end 48*b* that includes an angled edge 48*c* that terminates in a point 48*d*. The angled edge 48*c* includes an angle of 45 degrees with respect to a longitudinal length of the second extension member 48. The angled edge 48*c* is useful in positioning the tile contour tool 10 at a 45 degree angle, one that is common for many cuts (See FIG. 6).

Figure 6:
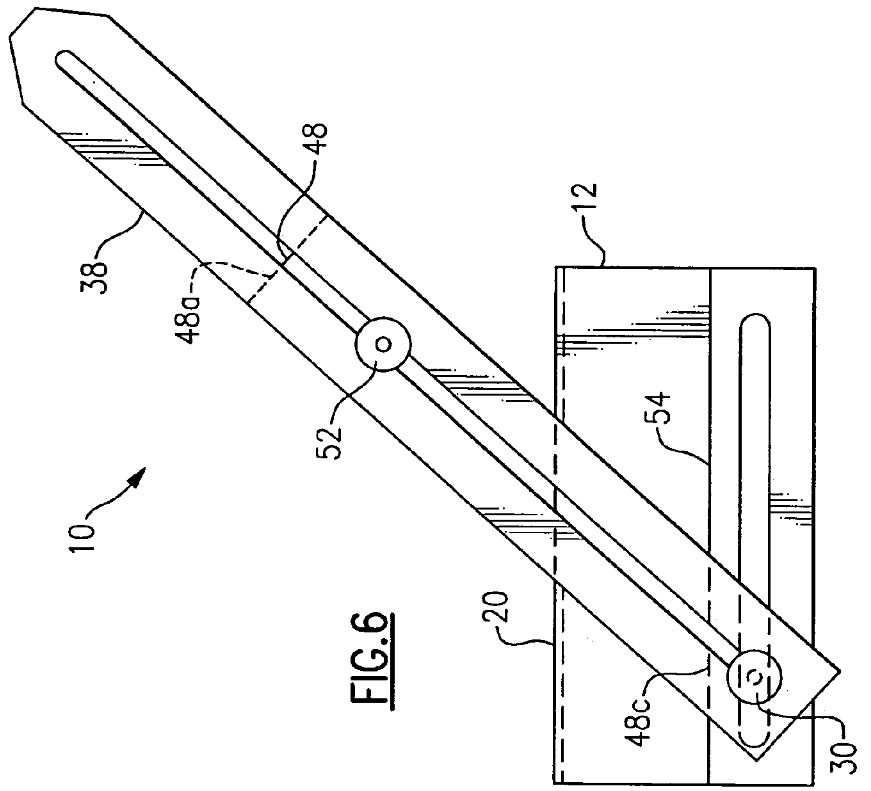
FIG. 6 is a plan view of a tile contour tool of FIG. 1 with a first and second extension member moved so as to provide a 45 degree angle.

Referring momentarily to FIG. 6, the angled edge 48*c* is placed against a raised edge 54 of the base member 12 that is parallel to the retaining lip 20.

To attain this position, the first fastener assembly 30 and the second fastener assembly 52 are loosened and the first extension member 38 and the second extension member 48 are both oriented as shown in the illustration with the angled edge 48*c* disposed against the raised edge 54 and the first extension member 38 and the second extension member 48 aligned longitudinally one on top of the other (i.e., with the first extension member 38 on top of the second extension member 48).

This allows the angled edge 48*c* to be positioned anywhere desired along the length of the raised edge 54 and it ensures that the first extension member 38 and the second extension member 48 will be at a forty-five degree angle with respect to the raised edge 54 (i.e., the retaining lip 20).

Figure 5:
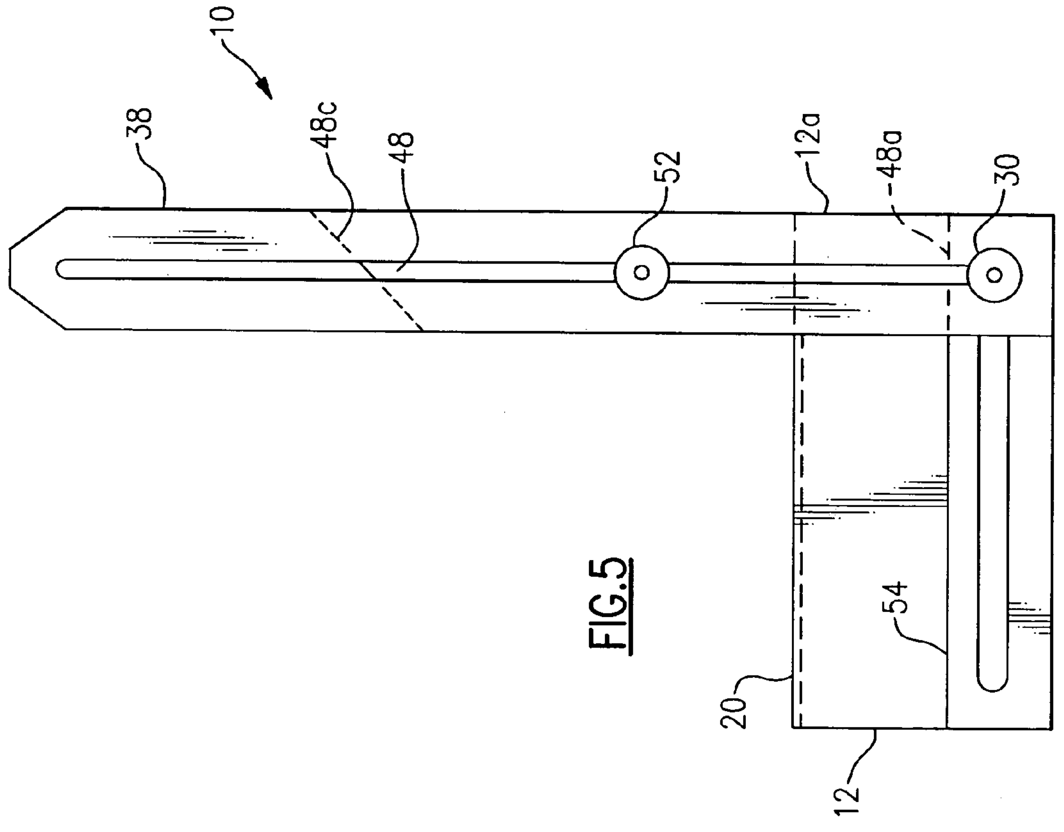
FIG. 5 is a plan view of a tile contour tool of FIG. 1 with a first and second extension member moved so as to provide a 90 degree (right angle) square.

Referring now momentarily to FIG. 5, the square edge 48*a* is placed against the raised edge 54 of the base member 12.

To attain this position, the first fastener assembly 30 and the second fastener assembly 52 are loosened and the first extension member 38 and the second extension member 48 are both oriented as shown in the illustration with the square edge 48*a* disposed against the raised edge 54 and the first extension member 38 and the second extension member 48 aligned longitudinally one on top of the other (i.e., with the first extension member 38 on top of the second extension member 48).

This also allows the square edge 48*a* to be positioned anywhere desired along the length of the raised edge 54 and it ensures that the first extension member 38 and the second extension member 48 will be at a ninety degree angle with respect to the raised edge 54 (i.e., the retaining lip 20).

The sides of the base member 12 are preferably all at right angles with respect to each other. Accordingly, it is also possible to align the first extension member 38 and the second extension member 48 on top of each other and adjacent to a side 12*a* of the base member 12 (as shown) in order to orient the first extension member 38 and the second extension member 48 at a ninety degree angle with respect to the raised edge 54.

Accordingly, the tile contour tool 10 can be used as a square (not shown).

Let us assume that the retaining lip 20 is adjacent to the right hand edge 26 of the tile 14 and the point 48*d* has been oriented so that it is adjacent to one location on the obstruction 24. It does not matter if the obstruction is a straight line (a wall for example) or a complex shape, as shown. Once the point 48*d* has been allowed to contact the obstruction, the first and second fastener assemblies 30, 52 are secured to maintain the desired position for the first and second extensions 38, 48. The tool 10 is then removed away from the obstruction 24. A new tile to cut (not shown) is placed adjacent to the retaining lip 20 on a side of the retaining lip 20 that is disposed maximally away from the first longitudinal slot 28 so as to proximate its desired installed location with respect to the tiles 14, 16. A mark is placed on the new tile to cut at the point 48*d*.

The tool 10 is then repositioned as originally described and the first and second fastener assemblies 30, 52 are loosened and the first and second extensions 38, 48 are repositioned so as to contact a second location 56 on the obstruction 24. The first and second fastener assemblies 30, 52 are tightened and the tool 10 is removed again away from the obstruction 24. The new tile to cut is again placed adjacent to the retaining lip 20 of the tool 10 and the second location is marked on the new tile to cut.

The process is repeated for as many additional locations 58–66 as desired so as to adequately convey the shape of the contour of the obstruction 24 to the new tile to cut. The new tile is cut and is then placed adjacent to the tile 14 where it should fit perfectly. The lip 20 compensates for the joint thickness thereby ensuring a perfect fit.

If a right angle cut is required (because the obstruction 24 includes a straight wall), then only one point is required to mark the tile to cut and make the cut. The new tile to cut is cut using well known tile cutting methods and equipment (not shown).

Similarly, if a 45 degree cut is required, a location at either end of the new tile to cut (where the 45 degree angle intersects an end of the new tile) is located off of the obstruction 24 and conveyed to the new tile to cut, which is then cut accordingly.

Figure 3:
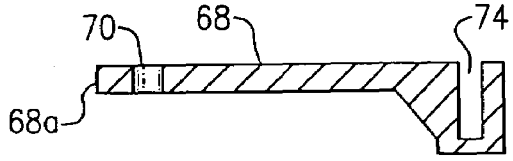
FIG. 3 is a is a cross sectional view of a accessory attachment member taken on the line 3—3 in FIG. 1.

Referring again to all of the drawings and in particular to FIG. 1 and FIG. 3, is shown an accessory attachment member 68. The accessory attachment member 68 includes a first end 68*a*. A hole 70 that is proximate the first end 68*a* includes a diameter that is sufficient to allow passage of a threaded rod (similar to the threaded rod 36) of a third fastener assembly 72.

A narrow slot 74 is included in a distal second end 68*b* of the accessory attachment member 68. If it is necessary to locate a modified obstruction that is circular in shape, then an adjustable ring 76 (shown in dashed lines in FIG. 1) is inserted in the slot 74 and is adjusted so as to include a diameter that is slightly more than that of the modified obstruction.

The first, second, and third fasteners 30, 52, 72 are loosened and the first and second extension members 38, 48 and the accessory attachment member 68 are all positioned so as to properly orient the adjustable ring 76 where the modified obstruction is located.

The first, second, and third fasteners 30, 52, 72 are then tightened and the tool 10 is moved away from the modified obstruction. An additional new tile to cut is then positioned adjacent to the retaining lip 20 and the location of the adjustable ring 76 is marked on the additional new tile, which is then cut and installed.

A typical device for use as the adjustable ring 76 includes a conventional type of a hose clamp. Any size hose clamp can be used and placed in the slot 74, which tends to hold it adequately in position.

Sometimes rectangular or other odd shapes are included as part of the modified obstruction, other than circular. In such instances a malleable member 78 (shown in dashed lines in FIG. 1) is inserted into the slot 74 and is bent as desired into the desired shape of the modified obstruction. Copper wire (without insulation) having a diameter that fits securely in the slot 74 is one example of a substance that can be used to form the malleable member 78. Otherwise, use of the tool 10 is as was described hereinabove.

The use of the second extension member 48, while highly preferable, is optional. It is possible to omit the second extension member 48 in certain applications and determine the location of certain types of the obstruction 24 by attaching, for example, a modified form of an accessory attachment member directly to the first extension member 38 where desired. The modified accessory attachment member is then used as described hereinabove for the accessory attachment member 68.

Other modifications are anticipated. For example, the adjustable ring 76 (i.e., the hose clamp) can also be bent to accommodate odd shapes such as escutcheons (i.e., cover plates).

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A tile contour tool, comprising:

(a) a base member including a retaining lip, said retaining lip extending a predetermined distance below a plane of said base member and including a thickness that approximates the thickness of a joint intermediate two tiles and wherein no portion of said base member other than said retaining lip extends below said plane;

(b) a first extension member having a first end and a second end and which is pivotally attached to said base member and wherein said first extension member is adapted to pivot around an axis with respect to said base member;

(c) means attached to said first extension member for determining at least one point of an obstruction; and including means for retaining said first extension member in a position relative to said base member, and wherein said means for retaining includes providing a first longitudinal slot in said base member and a second longitudinal slot in said first extension member, said retaining lip being parallel with respect to said first longitudinal slot and including a first fastener assembly that is adapted to cooperate with said first longitudinal slot and said second longitudinal slot sufficient to retain said first extension member with respect to said base member;

and wherein said first fastener assembly includes a base retainer that includes a narrow side and a long side, said narrow side being adapted to fit into a portion of said first longitudinal slot and adapted be displaced along a length thereof and wherein said long slide prevents said base retainer from rotating when it is disposed in the first longitudinal slot and including a threaded rod that is attached to said base retainer and which is adapted to extend through said second longitudinal slot and including a threaded nut that is adapted to cooperate with said threaded rod sufficient to secure said first extension member to said base member when said threaded nut is sufficiently tightened and wherein said first longitudinal slot includes a top portion and a bottom portion, said top portion including a width that is less than said bottom portion.

2. The tile contour tool of claim 1 wherein said first fastening assembly is adapted to pass through any portion of said first longitudinal slot and said second longitudinal slot and is adapted to secure said first extension member to said base member in a desired position.

3. The tile contour tool of claim 1 including a second extension member having a first end and a second end and which is pivotally attached to said first extension member and wherein said second extension member is adapted to pivot around an axis with respect to said first extension member.

4. The tile contour tool of claim 3 wherein said second extension member includes a third longitudinal slot.

5. The tile contour tool of claim 4 including a second fastener assembly that is adapted to pass through any portion of said second longitudinal slot and said third longitudinal slot and is adapted to secure said second extension member to said first extension member in a desired position.

6. The tile contour tool of claim 4 including an accessory attachment member that is adapted to be pivotally attached to said second extension member.

7. The tile contour tool of claim 6 wherein said accessory attachment member includes a first end having a hole therein proximate said first end and an opposite second end, said second end having a slot therein that is adapted to receive an accessory item therein.

8. The tile contour tool of claim 7 including a third fastener assembly that is adapted to cooperate with said hole in said accessory attachment member and said third longitudinal slot sufficient to retain said accessory attachment member in a desired position proximate said second extension member.

9. The tile contour tool of claim 7 wherein said accessory item includes a ring.

10. The tile contour tool of claim 9 wherein said ring includes an adjustable diameter.

11. The tile contour tool of claim 7 wherein said accessory item includes a malleable material.

12. The tile contour tool of claim 11 wherein said malleable material includes a segment of a wire.

13. The tile contour tool of claim 3 wherein said second end of said second extension member includes a point.

14. The tile contour tool of claim 13 wherein said second end of said second extension member includes a forty five degree angle that terminates at said point.

15. A tile contour tool, comprising:

(a) a base member including a retaining lip, said retaining lip extending a predetermined distance below a plane of said base member and including a thickness that approximates the thickness of a joint intermediate two tiles and wherein no portion of said base member other than said retaining lip extends below said plane;

(b) a first extension member having a first end and a second end and which is pivotally attached to said base member and wherein said first extension member is adapted to pivot around an axis with respect to said base member;

(c) means attached to said first extension member for determining at least one point of an obstruction;

including means for retaining said first extension member in a position relative to said base member, and wherein said means for retaining includes providing a first longitudinal slot in said base member and a second longitudinal slot in said first extension member, said retaining lip being parallel with respect to said first longitudinal slot and including a first fastener assembly that is adapted to cooperate with said first longitudinal slot and said second longitudinal slot sufficient to retain said first extension member with respect to said base member;

and including a second extension member having a first end and a second end and which is pivotally attached to said first extension member and wherein said second extension member is adapted to pivot around an axis with respect to said first extension member;

and wherein said second end of said second extension member includes a point; and wherein said second end of said second extension member includes a forty five degree angle that terminates at said point.

* * * * *